United States Patent
Kim (10) Patent No.: US 9,730,286 B2
(45) Date of Patent: Aug. 8, 2017

(54) CONTROL CIRCUIT AND METHOD FOR GENERATING VOLTAGE FOR LIGHT EMITTING DIODE LIGHTING DEVICE

(71) Applicant: SILICON WORKS CO., LTD., Daejeon (KR)

(72) Inventor: Yong Geun Kim, Suwon-si (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 14/892,940

(22) PCT Filed: May 21, 2014

(86) PCT No.: PCT/KR2014/004537
§ 371 (c)(1),
(2) Date: Nov. 20, 2015

(87) PCT Pub. No.: WO2014/189284
PCT Pub. Date: Nov. 27, 2014

(65) Prior Publication Data
US 2016/0113081 A1    Apr. 21, 2016

(30) Foreign Application Priority Data

May 22, 2013  (KR) .................. 10-2013-0057859

(51) Int. Cl.
*H05B 37/02*  (2006.01)
*H05B 33/08*  (2006.01)

(52) U.S. Cl.
CPC ..... *H05B 33/0824* (2013.01); *H05B 33/0809* (2013.01); *H05B 33/0845* (2013.01); *H05B 37/02* (2013.01)

(58) Field of Classification Search
CPC .............. H05B 33/0824; H05B 33/083; H05B 33/0833; H05B 33/0866; H05B 33/0872;
(Continued)

(56) References Cited

U.S. PATENT DOCUMENTS

| 2012/0062136 A1* | 3/2012 | Tsai | H05B 33/0851 315/224 |
| 2012/0081009 A1* | 4/2012 | Shteynberg | H05B 33/083 315/122 |
| 2015/0296582 A1* | 10/2015 | Jung | H05B 33/0812 315/185 R |

FOREIGN PATENT DOCUMENTS

| CN | 1816233 | 8/2006 |
| CN | 101137261 | 3/2008 |

(Continued)

OTHER PUBLICATIONS

International Search Report for International Application No. PCT/KR2014/004537, dated Sep. 22, 2014.
(Continued)

*Primary Examiner* — Jimmy Vu
*Assistant Examiner* — Henry Luong
(74) *Attorney, Agent, or Firm* — Kile Park Reed & Houtteman PLLC (57) ABSTRACT

Disclosed are a control circuit and a voltage generation method of an LED lighting apparatus which provides lighting using a rectified voltage. Light emission of the LED lighting apparatus can be implemented through current regulation, a rectified voltage used for light emission can be used to provide a constant voltage required for a peripheral circuit, and a current flowing through a current path formed by the current regulation can be controlled to perform dimming.

5 Claims, 6 Drawing Sheets

(58) Field of Classification Search
CPC ............ H05B 33/0848; H05B 33/0845; H05B 33/0842; H05B 37/02; H05B 37/036; H05B 37/029
USPC ....... 315/316, 312, 317, 319, 291–292, 297, 315/306–308
See application file for complete search history.

(56) References Cited

FOREIGN PATENT DOCUMENTS

| | | |
|---|---|---|
| CN | 102458023 | 5/2012 |
| KR | 10-1043533 | 6/2011 |
| KR | 10-2012-0044782 | 5/2012 |
| KR | 10-1175934 | 8/2012 |

OTHER PUBLICATIONS

Written Opinion for International Application No. PCT/KR2014/004537 with English Translation, dated Sep. 22, 2014.

* cited by examiner

CONTROL CIRCUIT AND METHOD FOR GENERATING VOLTAGE FOR LIGHT EMITTING DIODE LIGHTING DEVICE

TECHNICAL FIELD

The present disclosure relates to an LED lighting apparatus, and more particularly, to a control circuit of an LED lighting apparatus which provides lighting using a rectified voltage, and a voltage generation method of an LED light apparatus, which generates a voltage for a peripheral circuit using a rectified voltage.

BACKGROUND ART

According to the recent trend of lighting technology, an LED (Light Emitting Diode) has been employed as a light source.

A high-brightness LED is differentiated from other light sources in terms of various aspects such as energy consumption, lifetime, and light quality.

However, a lighting apparatus using LEDs as a light source may require additional circuits due to the characteristic of the LEDs which are driven by a constant current.

Examples of devices which have been developed to solve the above-described problem may include an AC direct-type lighting apparatus.

In general, the AC direct-type LED lighting apparatus is designed to rectify a commercial voltage and drive LEDs using the rectified voltage having a ripple which is two times larger than the commercial frequency. A voltage obtained by full-wave rectifying an AC voltage based on the commercial voltage is referred to as a rectified voltage.

Since the above-described AC direct-type LED lighting apparatus directly uses the rectified voltage as an input voltage without using an inductor and capacitor, the AC direct-type LED lighting apparatus has a favorable power factor.

The LED lighting apparatus includes a large number of LEDs connected in series, and the LEDs may be divided into a plurality of LED groups. The plurality of LED groups may be sequentially turned on/off according to the rise/fall of a rectified voltage having a ripple.

The LED lighting apparatus which is operated by the rectified voltage may additionally include a peripheral circuit for dimming control or operation control. That is, a sensor board which includes a sensor for sensing luminance or human body and performs dimming control or switching control, or a communication device which communicates with the outside may be configured as a peripheral circuit of the LED lighting apparatus.

In this case, the LED lighting apparatus needs to include a separate power supply circuit to supply an operating voltage to the peripheral circuit such as a sensor board or communication device.

When the additional power supply circuit is mounted to independently supply an operating voltage to the peripheral circuit, the configuration of the LED lighting apparatus may become complex.

Furthermore, as power is independently supplied to the additional parts as well as the LEDs of the LED lighting apparatus, the entire power consumption may be increased, and the power efficiency may be degraded.

DISCLOSURE

Technical Problem

Various embodiments are directed to a control circuit and a voltage generation method of an LED lighting apparatus, which are capable of using a rectified voltage for lighting of LEDs, and using a voltage used for lighting as an operating voltage of a peripheral circuit to perform dimming control or communication.

Also, various embodiments are directed to a control circuit and a voltage generation method of an LED lighting apparatus, which are capable of using a voltage used for lighting of LEDs as an operating voltage of a peripheral circuit to perform dimming control or communication, through a simple configuration.

Also, various embodiments are directed to a control circuit of an LED lighting apparatus, which is capable of using a voltage used for lighting of LEDs as an operating voltage of a peripheral circuit to perform dimming control or communication, thereby reducing the entire power consumption and improving power efficiency.

Also, various embodiments are directed to a control circuit of an LED lighting apparatus, which is capable of controlling lighting of LEDs using a rectified voltage and controlling a constant current through current regulation, thereby performing dimming control.

Technical Solution

In an embodiment, there is provided a control circuit of an LED lighting apparatus, which controls light emissions of a plurality of LED groups driven by a rectified voltage. The control circuit may include: a transmission circuit configured to transmit a voltage lowered from the rectified voltage by one or more LEDs included in the LED groups; and a voltage regulation circuit configured to regulate the lowered voltage and output the regulated voltage.

In an embodiment, there is provided a control circuit of an LED lighting apparatus which includes a plurality of LED groups receiving a rectified voltage. The control circuit may include: a current control circuit configured to provide a current path corresponding to sequential light emissions of the LED groups; a voltage regulation circuit configured to receive a voltage lowered from the rectified voltage by one or more LEDs included in the LED groups, store the received voltage, regulate the stored voltage, and output the regulated voltage as a constant voltage; and a dimming control circuit configured to operate using the constant voltage provided from the voltage regulation circuit, and control a current flow on the current path in response to one or more of an internal sensing signal and an external control signal.

In an embodiment, there is provided a voltage generation method of an LED lighting apparatus, which controls light emissions of a plurality of LED groups driven by a rectified voltage. The voltage generation method may include: primarily lowering the rectified voltage through one or more LEDs included in the LED groups; secondarily lowering the primarily lowered voltage, and outputting a DC voltage; and providing the DC voltage to a peripheral circuit.

Advantageous Effects

In accordance with the embodiments of the present invention, a surplus voltage which remains after being used for lighting of the LEDs can be reused as an operating voltage of the peripheral circuit. Thus, the entire power consumption can be reduced, and the power efficiency can be improved.

Furthermore, the voltage lowered in the LEDs can be used for providing an operating voltage of a peripheral circuit having low power consumption. Thus, a configuration for lowering a high-level rectified voltage into an operating voltage is not needed.

Furthermore, since a voltage lower than the rectified voltage is converted into an operating voltage, a circuit for providing an operating voltage can be implemented with a simple structure using cheap parts. Thus, the circuit for providing an operating voltage of the peripheral circuit can be economically implemented while having a simple structure.

Furthermore, while the rectified voltage is used to control lighting of the LEDs, dimming control can be performed by controlling a constant current through current regulation.

MODE FOR INVENTION

Hereafter, exemplary embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

The embodiments of the present invention disclose a control circuit of an AC direct-type LED lighting apparatus.

The AC direct-type LED lighting apparatus in accordance with the embodiment of the present invention uses a rectified voltage to perform LED illumination. The rectified voltage may indicate a voltage obtained by full-wave rectifying an AC voltage and having a characteristic that the voltage level thereof relatively rises or falls on a basis of a half cycle of the AC voltage. In the embodiment of the present invention, the rise or fall of the rectified voltage may indicate a rise or fall of the ripple of the rectified voltage.

Figure 1:
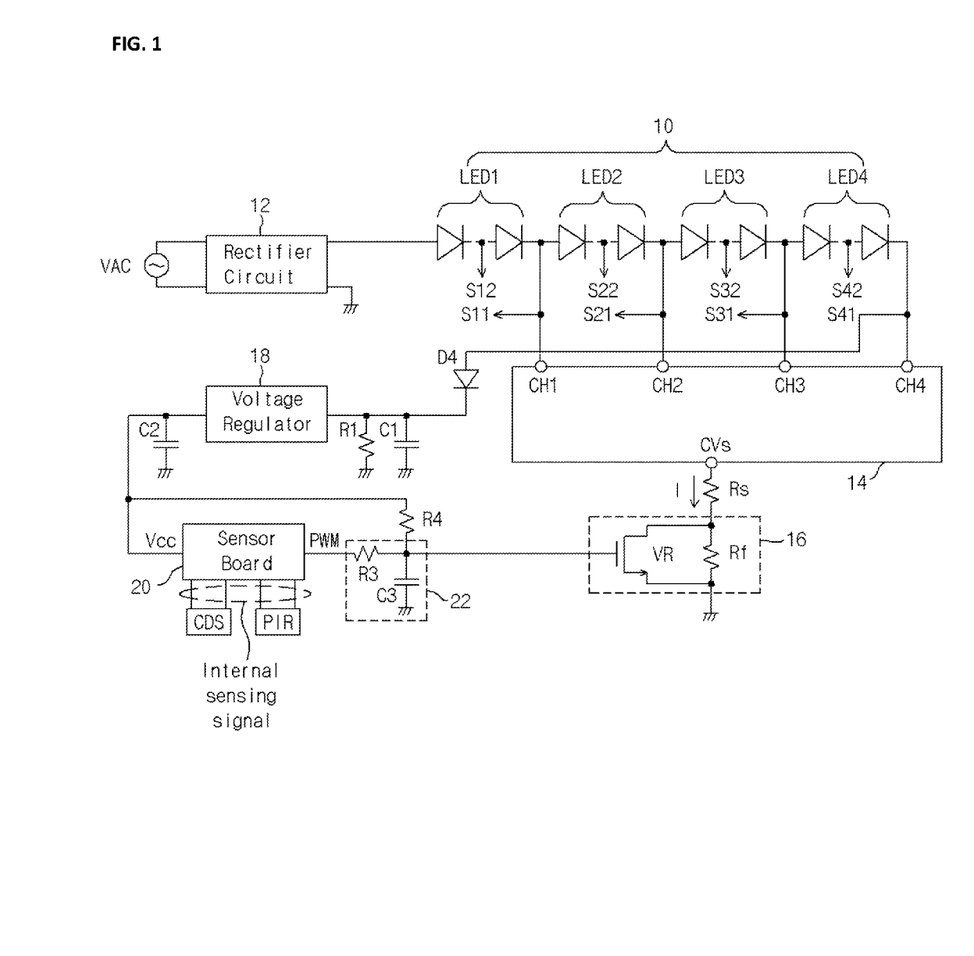
FIG. 1 is a circuit diagram illustrating a control circuit of an LED lighting apparatus in accordance with an embodiment of the present invention.
Figure 2:
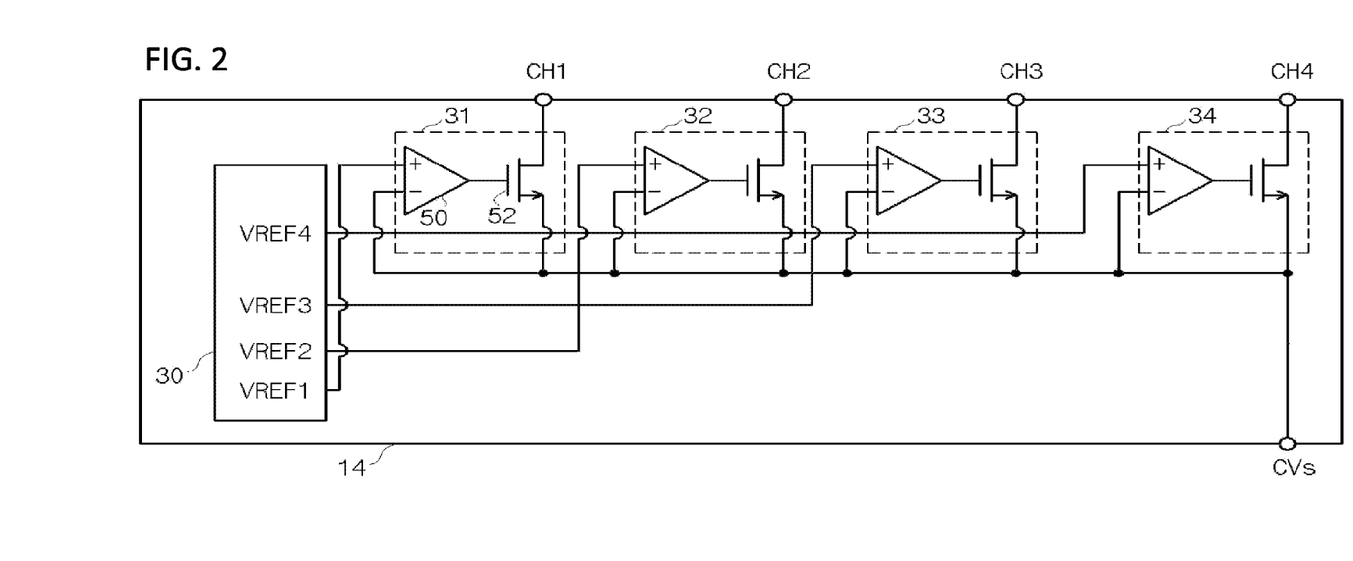
FIG. 2 is a detailed circuit diagram illustrating an example of a current control unit of FIG. 1.

The control circuit of the LED lighting apparatus in accordance with the embodiment of the present invention may be configured to perform current regulation for light emission of a lamp 10 as illustrated in FIGS. 1 and 2.

Furthermore, the control circuit of the LED lighting apparatus in accordance with the embodiment of the present invention may be configured to provide an operating voltage of a peripheral circuit such as a sensor board 20, using a voltage lowered by light emission of LEDs or LED groups forming the lamp 10.

Furthermore, the control circuit of the LED lighting apparatus in accordance with the embodiment of the present invention may have a function of controlling dimming of the lamp 10 in response to a sensing signal or external control signal.

First, the LED lighting apparatus in accordance with the embodiment of the present invention may include a lamp 10, a power supply unit, and a current control unit. The power supply unit may provide a rectified voltage to the lamp 10, and the current control unit may provide a current path for light emission to each of LED groups LED1 to LED4 of the lamp 10.

The lamp 10 may include a plurality of LEDs which are divided into the plurality of LED groups LED1 to LED4. The LED groups of the lamp 10 may be sequentially turned on/off by the rectified voltage.

In the embodiment of the present invention, the lamp 10 may include four LED groups LED1 to LED4. Each of the LED groups LED1 to LED4 may include an equal or different number of LEDs, and a dotted line in each of the LED groups LED1 to LED4 in FIG. 1 indicates that illustration of LEDs is omitted. As described above, the lamp 10 may include four LED groups LED1 to LED4. However, the present invention is not limited thereto, but the lamp 10 may include various numbers of LED groups.

The power supply unit may be configured to rectify an external AC voltage and output the rectified voltage, and include an AC power source VAC for providing the AC voltage and a rectifier circuit 12 for outputting the rectified voltage by rectifying the AC voltage. The AC power source VAC may include a commercial power source.

The rectifier circuit 12 may full-wave rectify a sine-wave AC voltage, and output the rectified voltage.

The current control circuit may include a current control unit 14 and a sensing resistor Rs.

The current control unit 14 may perform current regulation for light emission of the LED groups LED1 to LED4.

The current control unit 14 may be configured to provide a current path for current regulation through the sensing resistor Rs.

In the embodiment of the present invention, the LED groups LED1 to LED4 of the lamp 10 may be sequentially turned on or off in response to a ripple of the rectified voltage which rises or falls.

When the rectified voltage rises to sequentially reach light emission voltages of the respective LED groups LED1 to LED4, the current control unit 14 may provide a current path for light emission to the respective LED groups LED1 to LED4. In the current control unit 14, CH1 to CH4 represent terminals for providing current paths to the respective LED groups LED1 to LED4. Furthermore, CVs represents a terminal connected to the sensing resistor Rs.

The light emission voltage VCH4 at which the LED group LED4 emits light may be defined as a voltage at which all of the LED groups LED1 to LED4 emit light, the light emission voltage VCH3 at which the LED group LED3 emits light may be defined as a voltage at which all of the LED groups LED1 to LED3 emit light, the light emission voltage VCH2 at which the LED group LED2 emits light may be defined as a voltage at which both of the LED groups LED1 and LED2 emit light, and the light emission voltage VCH1 at which the LED group LED1 emits light may be defined as a voltage at which only the LED group LED1 emits light.

The current control unit 14 may receive a sensing voltage through the sensing resistor Rs. The sensing voltage may be varied by a current path which is differently formed according to the light emitting states of the respective LED groups in the lamp 10. At this time, the current flowing through the sensing resistor Rs may include a constant current.

The current control unit 14 which performs current regulation in response to a rise of the rectified voltage may be configured as illustrated in FIG. 2.

Referring to FIG. 2, the current control unit 14 may include a plurality of switching circuits 31 to 34 configured to provide current paths for the respective LED groups LED1 to LED4 and a reference voltage supply unit 30 configured to provide reference voltages VREF1 to VREF4.

The reference voltage supply unit 30 may be configured to provide the reference voltages VREF1 to VREF4 having different levels according to a designer's intention.

The reference voltage supply unit 30 may include a plurality of resistors which are connected in series to each other so as to receive a constant voltage, for example. The reference voltage supply unit 30 may output the reference voltages VREF1 to VREF4 having different levels through nodes among the respective resistors. In another embodiment, the reference voltage supply unit 30 may include independent voltage supply sources for providing the reference voltages VREF1 to VREF4 having different levels.

Among the reference voltages VREF1 to VREF4 having different levels, the reference voltage VREF1 may have the lowest voltage level, and the reference voltage VREF4 may have the highest voltage level. The voltage level may gradually increase in order of VREF1, VREF2, VREF3, and VREF4.

The reference voltage VREF1 may have a level for turning off the switching circuit 31 at the point of time that the LED group LED2 emits light. More specifically, the reference voltage VREF1 may be set to a level equal to or lower than the sensing voltage which is formed in the sensing resistor Rs by the light emission voltage VCH2 of the LED group LED2.

The reference voltage VREF2 may have a level for turning off the switching circuit 32 at the point of time that the LED group LED3 emits light. More specifically, the reference voltage VREF2 may be set to a level equal to or lower than the sensing voltage which is formed in the sensing resistor Rs by the light emission voltage VCH3 of the LED group LED3.

The reference voltage VREF3 may have a level for turning off the switching circuit 33 at the point of time that the LED group LED4 emits light. More specifically, the reference voltage VREF3 may be set to a level equal to or lower than the sensing voltage which is formed in the sensing resistor Rs by the light emission voltage VCH4 of the LED group LED4.

Furthermore, the reference voltage VREF4 may be set in such a manner that the current flowing through the sensing resistor Rs becomes a constant current in the upper limit level region of the rectified voltage.

The switching circuits 31 to 34 may be commonly connected to the current sensing resistor Rs for providing a sensing voltage in order to perform current regulation and to form a current path.

The switching circuits 31 to 34 may compare the sensing voltage of the sensing resistor Rs to the reference voltages VREF1 to VREF4 of the reference voltage supply unit 30, and form a selective current path for light emission of the lamp 10.

Each of the switching circuits 31 to 34 may receive a high-level reference voltage as the switching circuit is connected to an LED group remote from the position to which the rectified voltage is applied.

Each of the switching circuits 31 to 34 may include a comparator 50 and a switching element, and the switching element may include an NMOS transistor 52.

The comparator 50 included in each of the switching circuits 31 to 34 may have a positive input terminal (+) configured to receive a reference voltage, a negative input terminal (−) configured to receive a sensing voltage, and an output terminal configured to output a result obtained by comparing the reference voltage and the sensing voltage.

The NMOS transistor 52 included in each of the switching circuits 31 to 34 may perform a switching operation according to the output of the comparator 50, which is applied to the gate thereof. The drain of the NMOS transistor 52 and the negative input terminal (−) of the comparator 50 may be commonly connected to the sensing resistor Rs.

According to the above-described configuration, the sensing resistor Rs may apply the sensing voltage to the input terminal (−) of the comparator 50, and provide a current path corresponding to any one of the NMOS transistors 52 of the switching circuits 31 to 34.

The LED lighting apparatus in accordance with the embodiment of the present invention may perform current regulation and control current path formation, in order to control light emissions of the LED groups.

More specifically, when the rectified voltage is in the initial state, the LED groups do not emit light. At this time, the sensing resistor Rs may provide a low-level sensing voltage. The level of the rectified voltage in the initial state may be defined as a level lower than the light emission voltage VCH1 at which the LED group LED1 emits light.

When the rectified voltage is in the initial state, all of the switching circuits 31 to 34 may maintain a turn-on state, because the reference voltages VREF1 to VREF4 applied to the positive input terminals (+) of the respective switching circuits 31 to 34 are higher than the sensing voltage applied to the negative input terminals (−) of the respective switching circuits 31 to 34.

Then, when the rectified voltage rises to reach the light emission voltage VCH1, the turned-on switching circuit 31 of the current control unit 14 connected to the LED group LED1 may provide a current path, and the LED group LED1 of the lamp 10 may emit light. When the rectified voltage reaches the light emission voltage VCH1 such that the LED group LED1 emits light, the level of the sensing voltage of the sensing resistor Rs1 may rise due to a current flow through the switching circuit 31 to provide a current path.

Then, when the rectified voltage continuously rises to reach the light emission voltage VCH2, the LED group LED2 may emit light, and a current path for light emission may be formed by the turned-on switching circuit 32. At this time, the LED group LED1 may also maintain the light emitting state.

When the amount of current flowing through the sensing resistor Rs exceeds the limit value to which the switching circuit 31 can maintain the turn-on state, the switching circuit 31 may be turned off by the sensing voltage of the sensing resistor Rs. That is, when the rectified voltage reaches the light emission voltage VCH2 such that the LED group LED2 emits light, the level of the sensing voltage of the sensing resistor Rs may rise. At this time, the sensing voltage may have a higher level than the reference voltage VREF1. Therefore, the NMOS transistor 52 of the switching circuit 31 may be turned off by the output of the comparator

50. That is, the switching circuit 32 may provide a selective current path corresponding to the light emission of the LED group LED2, and the switching circuit 31 may be turned off.

Then, when the rectified voltage continuously rises to reach the light emission voltage VCH3, the LED group LED3 may emit light, and a current path for light emission may be formed by the turned-on switching circuit 33. At this time, the LED groups LED1 and LED2 may also maintain the light emitting state.

When the amount of current flowing through the sensing resistor Rs exceeds the limit value to which the switching circuit 32 can maintain the turn-on state, the switching circuit 32 may be turned off by the sensing voltage of the sensing resistor Rs. That is, when the rectified voltage reaches the light emission voltage VCH3 such that the LED group LED3 emits light, the level of the sensing voltage of the sensing resistor Rs may rise. At this time, the sensing voltage may have a higher level than the reference voltage VREF2. Therefore, the NMOS transistor 52 of the switching circuit 32 may be turned off by the output of the comparator 50. That is, the switching circuit 33 may provide a selective current path corresponding to the light emission of the LED group LED3, and the switching circuit 32 may be turned off.

Then, when the rectified voltage continuously rises to reach the light emission voltage VCH4, the LED group LED4 may emit light, and a current path for light emission may be formed by the turned-on switching circuit 34. At this time, the LED groups LED1 to LED3 may also maintain the light emitting state.

When the amount of current flowing through the sensing resistor Rs exceeds the limit value to which the switching circuit 33 can maintain the turn-on state, the switching circuit 33 may be turned off by the sensing voltage of the sensing resistor Rs. That is, when the rectified voltage reaches the light emission voltage VCH4 such that the LED group LED4 emits light, the level of the sensing voltage of the sensing resistor Rs may rise. At this time, the sensing voltage may have a higher level than the reference voltage VREF3. Therefore, the NMOS transistor 52 of the switching circuit 33 may be turned off by the output of the comparator 50. That is, the switching circuit 34 may provide a selective current path corresponding to the light emission of the LED group LED2, and the switching circuit 33 may be turned off.

Then, although the rectified voltage continuously rises, the switching circuit 34 may maintain the turn-on state, because the reference voltage VREF4 provided to the switching circuit 34 has a higher level than the sensing voltage formed at the sensing resistor Rs according to the upper limit level of the rectified voltage.

Figure 3:
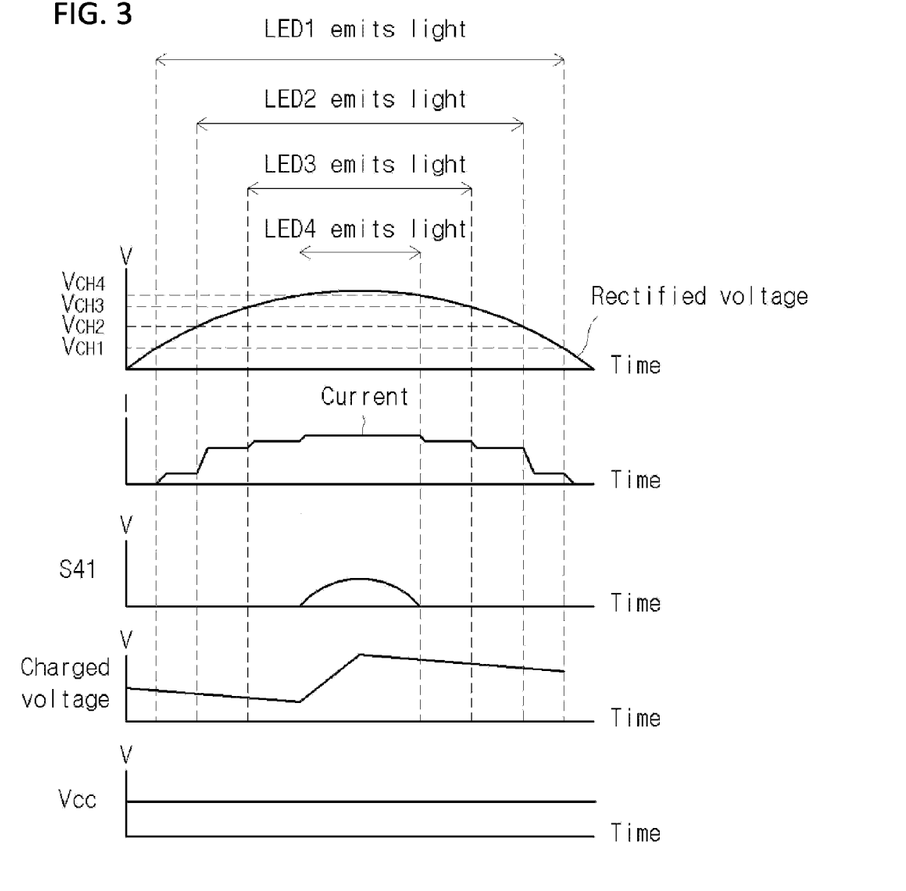
FIG. 3 is a waveform diagram based on the operation of the control circuit of the LED lighting apparatus in accordance with the embodiment of the present invention.

When the LED groups LED1 to LED4 sequentially emit light in response to the rises of the rectified voltage, the current corresponding to the light emitting states may increase in a stepwise manner as illustrated in FIG. 3. That is, since the current control unit 14 performs constant current regulation, the current corresponding to light emission of each LED group may maintain a predetermined level. When the number of LED groups to emit light increases, the level of the current may rise in response to the increase in number of LED groups.

After the rectified voltage rises to the upper limit level, the rectified voltage may start to fall.

When the rectified voltage drops from the upper limit level and falls below the light emission voltage VCH4, the LED group LED4 may have difficulties in maintaining light emission. At this time, the switching circuit 33 may be turned on in response to a fall of the sensing voltage of the sensing resistor Rs. Thus, the LED group LED4 may be turned off, and the light emission state may be maintained by the LED groups LED3, LED2, and LED1. The current path for the light emission of the LED groups LED3, LED2, and LED1 may be provided by the turned-on switching circuit 33. Then, when the rectified voltage sequentially falls below the light emission voltage VCH3, the light emission voltage VCH2, and the light emission voltage VCH1, the switching circuits 32 and 31 may be sequentially turned on, and the LED groups LED3, LED2, and LED1 of the lamp 10 may be sequentially turned off.

As the LED groups LED3, LED2, and LED1 of the lamp 10 are sequentially turned off, the current control unit 14 may provide a selective current path formed by the switching circuits 33, 32, and 31, while shifting the current path. Furthermore, in response to the turn-off states of the LED groups LED1 to LED4, the level of the sensing current may also fall in a stepwise manner.

As described above, the control circuit of the LED lighting apparatus in accordance with the embodiment of the present invention may sequentially turn on/off the LED groups in response to the rises/falls of the rectified voltage, and control current regulation and current path formation in response to the turn-on/off of the LED groups.

The control circuit of the LED lighting apparatus in accordance with the embodiment of the present invention may include a transmission circuit and a voltage regulation circuit, in order to supply an operating voltage of a peripheral circuit.

That is, the control circuit of the LED lighting apparatus in accordance with the embodiment of the present invention may include the transmission circuit which transmits a voltage obtained by lowering the rectified voltage through one or more LEDs included in the LED groups LED1 to LED4 of the lamp 10, and the voltage regulation circuit which performs a regulation operation including a charging/discharging operation for electrical energy including one or more of a voltage component and a current component. More specifically, the voltage regulation circuit may be configured to store a voltage lowered in the lamp 10, regulate the stored voltage, and output the regulated voltage as a constant voltage.

The transmission circuit may include one or more diodes which are connected in the forward direction, at each position from which the lowered voltage is outputted. FIG. 1 illustrates that a diode D4 is connected to an output terminal of the LED group LED4. When two or more diodes are included, the lowered voltage may be transmitted to the voltage regulation circuit through a common node coupled to the two or more diodes.

The voltage regulation circuit may include a charging circuit and a voltage regulator 18. The charging circuit may store the lowered voltage, and the voltage regulator 18 may regulate the voltage stored in the charging circuit and output the regulated voltage as a constant voltage.

The charging circuit may include a capacitor C1 connected in parallel to the diode D4 and the voltage regulator 18. The charging circuit may further include a resistor R1, and the resistor R1 may be connected in parallel to the capacitor C1, in order to transmit a charge voltage.

The charging circuit may further include a capacitor C2 for stabilizing the output voltage of the voltage regulator 18. The voltage regulator 18 may regulate the voltage stored in the capacitor C1 and output the regulated voltage as a constant voltage. The voltage regulator 18 may include a constant voltage source which outputs a constant voltage in response to an input voltage which is varied to be regulated to a constant voltage. A Zener diode may be used as the constant voltage source.

The voltage regulator 18 may be configured to output a constant voltage of 5V which can be used as an operating voltage of a peripheral circuit. The capacitor C1 included in the charging circuit of the voltage regulation circuit may be configured to have capacitance at which a voltage of 10V to 50V can be stored in order to guarantee the output of the voltage regulator 18.

The capacitor C1 may be configured to receive a voltage obtained by lowering the rectified voltage through one or more diodes included in the lamp 10, and store a voltage of 10V to 50V. For this operation, one or more of output terminals of the LED groups LED1 to LED4 or output terminals of the LEDs in the respective LED groups LED1 to LED4 may be selected as the position for supplying a voltage to the capacitor C1.

That is, voltages S11, S12, S21, S22, S31, S32, S41, and S42 may be outputted from the respective positions where the falls of the rectified voltage occurred in the lamp 10, and one or more of the voltages S11, S12, S21, S22, S31, S32, S41, and S42 may be applied to the capacitor C1. When a plurality of voltages are applied to the capacitor C1, the plurality of voltages may be applied in parallel to the capacitor C1 through the common node.

For example, the capacitor C1 included in the voltage regulation circuit may receive outputs of two or more LED groups as lowered voltages, among the above-described signals. More desirably, the capacitor C1 may receive one or more outputs of the LED groups having the LED groups having the highest light emission voltage and the second highest light emission voltage, as lowered voltages.

FIG. 1 illustrates that the voltage V41 outputted from the LED group LED4 having the highest light emission voltage is applied to the capacitor C1 through the forward diode D4.

Based on the above-described configuration of the control circuit of the LED lighting apparatus in accordance with the embodiment of the present invention, an operation of charging the capacitor C1 with a voltage will be described with reference to FIG. 3.

First, suppose that the light emission voltage of the LED group LED1 is 45V, the light emission voltage of the LED group LED2 is 45V, the light emission voltage of the LED group LED3 is 30V, and the light emission voltage of the LED group LED4 is 15V.

In this case, when all of the LED groups LED1 to LED4 emit light, a voltage of 135V may be required. In the above-described driving environment, a rectified voltage having a peak value of 150V may be provided. After the LED group LED4 emits light, a surplus voltage of about 15V may occur.

Under the above-described supposition, the waveform of the voltage S41 outputted to the output terminal of the LED group LED4 after the LED group LED4 emits light may be changed into a waveform illustrated in FIG. 3. That is, the voltage S41 having a peak value of 15V may be outputted from the LED group LED4.

When the above-described voltage is applied to the capacitor C1 through the diode D4, the charge voltage of the capacitor C1 may rise from the point of time that the LED group LED4 emits light to the point of time that the voltage S41 outputted form the LED group LED4 reaches the peak value, as illustrated in FIG. 3. Then, the charge voltage of the capacitor C1 may fall from the point of time that the voltage S41 outputted from the LED group LED4 reaches the peak value to the point of time that the LED group LED4 emits light again, as illustrated in FIG. 3.

The capacitor C1 may be designed to maintain a charge voltage of 10V to 50V such that the voltage regulator 18 can continuously output a constant voltage.

The charge voltage of the capacitor C1 may be provided to the voltage regulator 18, and the voltage regulator 18 may regulate the charge voltage and output the regulated voltage as a constant voltage of 5V. The capacitor C2 may be additionally formed at the output terminal of the voltage regulator 18, in order to stabilize the constant voltage outputted from the voltage regulator 18.

As described above, the constant voltage outputted from the voltage regulator 18 may be used as an operating voltage Vcc of a peripheral circuit.

That is, in the present embodiment, a voltage lowered in the LEDs (or LED groups) forming the lamp 10 can be provided as the operating voltage of the peripheral circuit, through the simple configuration.

When a high-level rectified voltage is used to provide an operating voltage, a complex circuit may be required to divide the high-level rectified voltage and regulate the divided voltage. Furthermore, expensive parts may be required to form the circuit.

In the present embodiment, however, since the voltage lowered to a low voltage is converted into the operating voltage, the circuit for providing the operating voltage can be implemented as a simple structure using cheap parts.

Furthermore, since the control circuit of the LED lighting apparatus in accordance with the embodiment of the present invention can provide the operating voltage by reusing a surplus voltage which occurs in the lamp 10, the entire power consumption can be reduced, and the power efficiency can be improved.

In the embodiment of the present invention, a circuit for performing an operation related to control for light emissions of the plurality of LED groups may be selected as a peripheral circuit which receives the constant voltage outputted from the voltage regulator 18. More specifically, the peripheral circuit may include one or more of a sensor board 20 and a communication device. The sensor board 20 may perform dimming control in response to one or more of an internal sensing signal and an external control signal, and the communication device may transmit/receive a signal for dimming control.

FIG. 1 illustrates that the sensor board 20 is implemented as the peripheral circuit. The sensor board 20 may receive a constant voltage outputted from the voltage regulator 18 as the operating voltage Vcc.

Furthermore, the sensor board 20 may control dimming of the lamp 10 in response to an internal sensing signal or an external control signal.

For this operation, the control circuit of the LED lighting apparatus in accordance with the embodiment of the present invention may include the sensor board 20 and the dimming adjusting circuit 16. Additionally, the control circuit of the LED lighting apparatus may include an output circuit 22 for transmitting an output of the sensor board 20 to the dimming adjusting circuit 16.

The sensor board 20 may include a luminance sensor CDS or a human body sensor PIR. The luminance sensor CDS may control dimming by sensing surrounding brightness (luminance), and the human body sensor PIR may sense a human body and control on/off of the lamp 10.

The sensor board 20 may be configured to control the dimming or on/off of the lamp 10 in response to an external control signal as well as the above-described internal sensing signal.

That is, the sensor board 20 may be configured to receive the operating voltage Vcc and output a dimming control signal for controlling dimming or on/off in response to the internal sensing signal or the external control signal.

FIG. 1 illustrates that a control pulse PWM is outputted as the dimming control signal.

The control pulse PWM may have a duty ratio which is varied for dimming or on/off control.

For example, the control pulse may have a duty ratio which is varied in the range of 10 to 100, for dimming control. Furthermore, the control pulse may have a duty ratio of less than 10, in order to turn off the lamp 10. The duty ratio for turning off the lamp 10 is only an example for describing the embodiment of the present invention. The duty ratio for turning off the lamp 10 may be varied so as to determine the turn-off level in the range of 5 to 30, according to a designer's intention.

The dimming control signal may be outputted as a DC voltage as well as the above-described control pulse. That is, dimming or light emission of the lamp 10 can be controlled in response to the DC level of the dimming control signal.

In the embodiment of the present invention, the configuration in which the control pulse is outputted has been taken an example for description. However, the present invention is not limited thereto.

The output circuit 22 may include a resistor R3 and a capacitor C3 which filter the control pulse PWM outputted from the sensor board 20. The resistor R3 may be connected in series to the output terminal of the sensor board 20, and the capacitor C3 may have a grounded terminal while the other terminal thereof is connected in parallel to the resistor R3.

The output circuit 22 may perform an RC filter operation for the control pulse PWM.

Furthermore, the output circuit 22 may receive the constant voltage outputted from the voltage regulator 18 through the resistor R4. In this case, the output circuit 22 may load the control pulse PWM into the constant voltage and provide the constant voltage to the dimming adjusting circuit 16.

The dimming adjusting circuit 16 may be connected in series to the sensing resistor Rs and form a current path. While providing a minimum current maintaining voltage for forming a current path, the dimming adjusting circuit 16 may control the current of the current path formed in the current control unit 14 in response to the dimming control signal provided from the sensor board 20.

For this operation, the dimming adjusting circuit 16 may include a resistor Rf and a variable resistor VR which are connected in parallel to the sensing resistor Rs. The resistor Rf may provide a fixed resistance value corresponding to a current path, and provide the minimum current retaining voltage of the current path. The variable resistor VR may include a variable resistor having a resistance value which is varied by the dimming control signal outputted from the sensor board 20, that is, the control pulse PWM.

The variable resistor VR may include an NMOS transistor of which the source and drain are connected to the resistor Rf, and the NMOS transistor may have a resistance value (turn-on resistance) which is adjusted according to the control pulse PWM applied to the gate thereof. The resistance value of the NMOS transistor corresponding to the control pulse PWM may be defined as a corresponding to a turn-on time. When the dimming control signal is applied as a DC voltage, the resistance value of the NMOS transistor may correspond to the level of a DC voltage for controlling a current flow.

The NMOS transistor implemented with a variable resistor may control the amount of current flowing through the current path formed in the current control unit 14 in response to the control pulse PWM provided from the sensor board 20. That is, the NMOS transistor may allow a current flow during a high-level period of the control pulse PWM, and block a current flow during a low-level period of the control pulse PWM.

Figure 4:
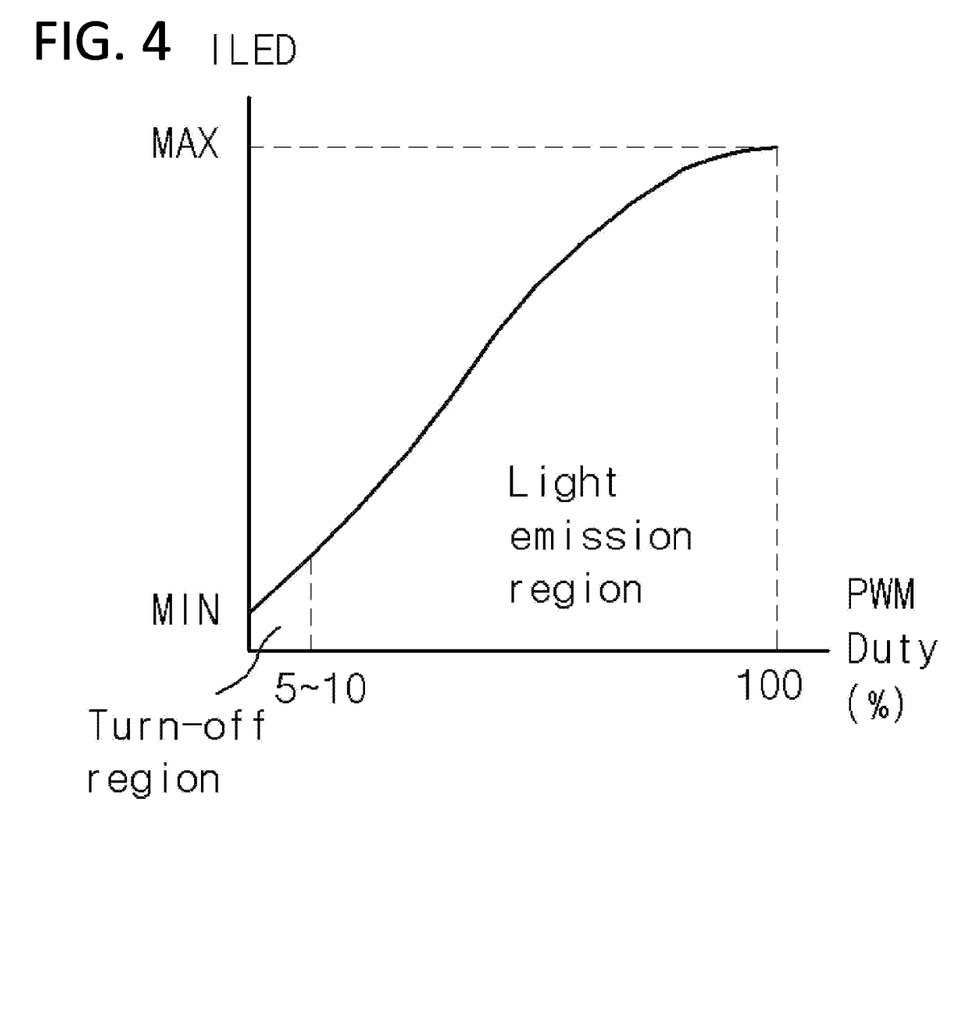
FIG. 4 is a waveform diagram for describing dimming control.

Through the operation of the NMOS transistor implemented with the variable resistor VR, the dimming adjusting circuit 16 may control a current flow as illustrated in FIG. 4. That is, when the control pulse PWM has the maximum duty ratio, the maximum current may flow through the dimming adjusting circuit 16, and when the control pulse PWM has the minimum duty ratio, the minimum current may flow through the dimming adjusting circuit 16.

FIG. 4 illustrates that the region in which the duty ratio of the control pulse PWM ranges from 5 to 10 is set to the turn-off region of the lamp 10. Although not illustrated in FIG. 4, a saturation region of which the luminance is approximate to the maximum brightness may be formed when the duty ratio reaches the range of 85 to 90.

The control circuit of the LED lighting apparatus in accordance with the embodiment of the present invention may perform current regulation according to the control pulse PWM provided from the sensor board 20, and control a constant current through the current regulation, thereby performing dimming control.

As described above, one or more of the output terminals of the LED groups LED1 to LED4 or the output terminals of the LEDs in the respective LED groups LED1 to LED4 may be selected as the position for supplying a voltage to the capacitor C1 connected to the input terminal of the voltage regulator 18. An example of the configuration may be illustrated in FIG. 5.

Figure 5:
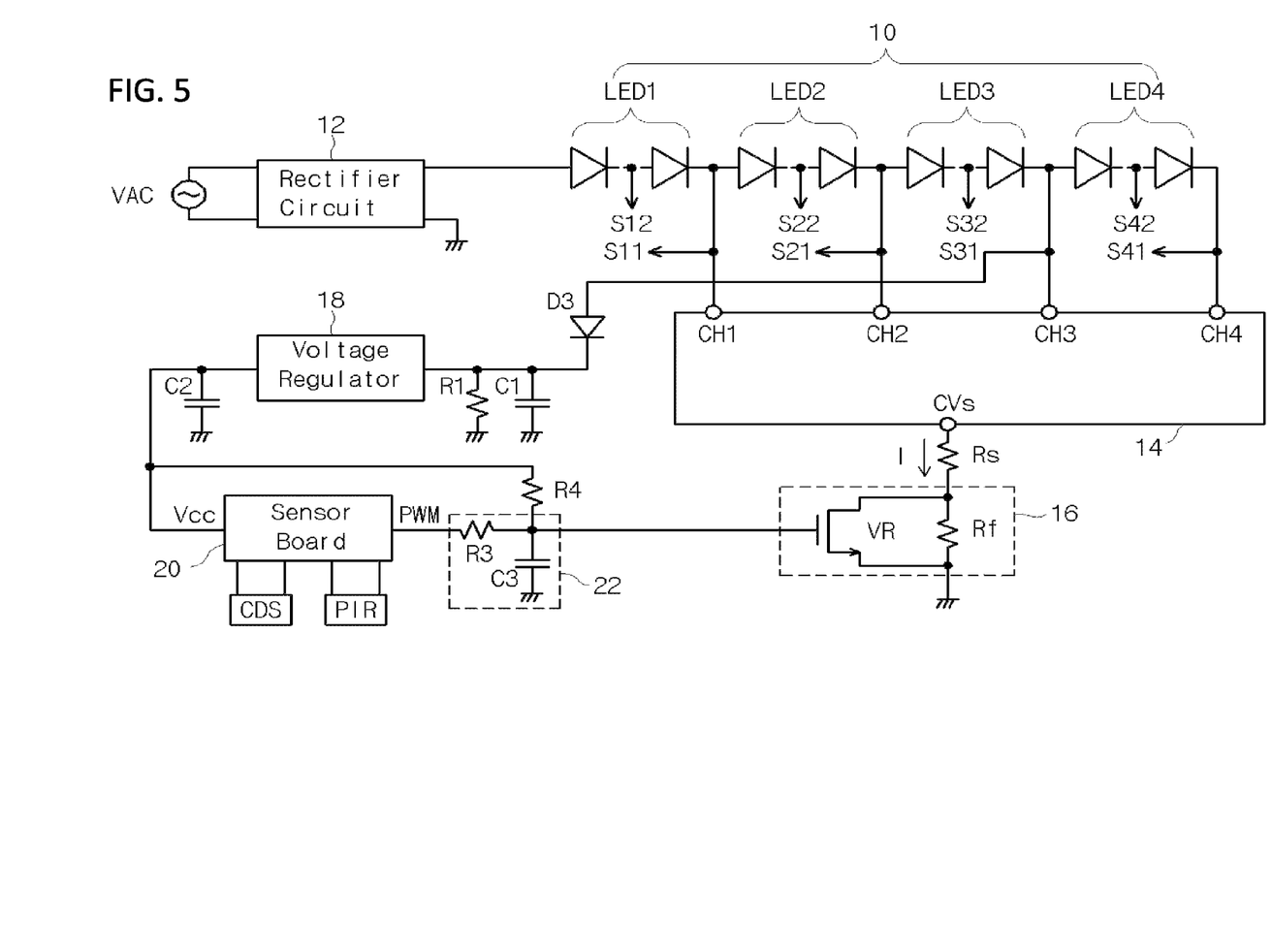
FIG. 5 is a circuit diagram illustrating a control circuit of an LED lighting apparatus in accordance with another embodiment of the present invention.

FIG. 5 illustrates that the voltage S31 outputted from the LED group LED3 having the second highest light emission voltage is applied to the capacitor C1 through the forward diode D3.

The charging operation of charging the capacitor C1 with a voltage according to the embodiment of FIG. 5 will be described with reference to FIG. 6.

Figure 6:
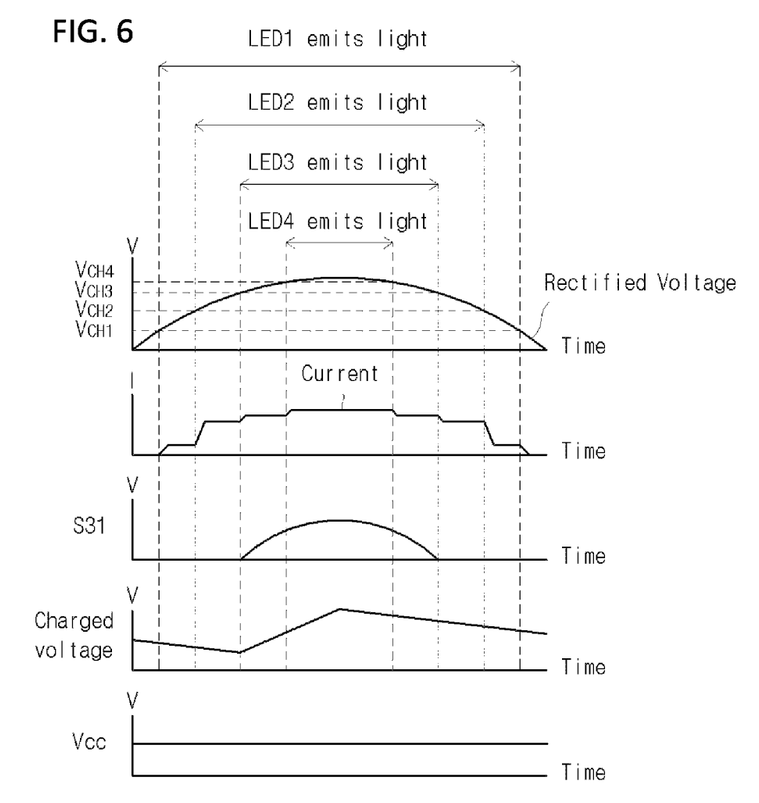
FIG. 6 is a waveform diagram based on the operation of the control circuit of the LED lighting apparatus in accordance with the embodiment of the present invention.

In the embodiment of FIGS. 5 and 6, the charging period in which the capacitor C1 is charged may differ from the embodiment described with reference to FIGS. 1 to 4.

That is, a surplus voltage generated by the rectified voltage which rises after the LED group LED3 emits light may become the voltage S31 outputted from the LED group LED3, and the voltage S31 may be transmitted to the capacitor C1 through the forward diode D3 so as to charge the capacitor C1. That is, the capacitor C1 may be charged until the rectified voltage reaches the peak value after the LED group LED3 emits light, and then gradually discharged until the LED group LED3 emits light again.

Thus, in accordance with the embodiment of the present invention, a surplus voltage which remains after being used for lighting of the LEDs can be used from various positions of the lamp. Since the surplus voltage can be reused as an operating voltage of the peripheral circuit, the entire power consumption can be reduced, and the power efficiency can be improved.

Furthermore, since the lowered voltage lower than the rectified voltage is converted into an operating voltage, the operating voltage required for other components can be generated and provided through a simple structure using cheap parts.

While various embodiments have been described above, it will be understood to those skilled in the art that the embodiments described are by way of example only. Accordingly, the disclosure described herein should not be limited based on the described embodiments.

The invention claimed is:

1. A control circuit of an LED lighting apparatus, which controls light emissions of a plurality of LED groups driven by a rectified voltage, comprising:
   a transmission circuit configured to transmit a voltage lowered from the rectified voltage by one or more LEDs included in the LED groups;
   a voltage regulation circuit configured to regulate the lowered voltage;
   a peripheral circuit configured to comprise a sensor board configured to output a dimming control signal in response to one or more of an internal sensing signal or an external control signal;
   a dimming adjusting circuit having a resistance value which is varied in response to the dimming control signal and configured to control an amount of current in a current path in response to the dimming control signal; and
   a current control circuit configured to provide the current path corresponding to sequential light emissions of the LED groups,
   wherein the current control circuit comprises a sensing resistor configured to maintain a connection state to the current path and provide a sensing voltage corresponding to a current flowing through the current path, and changes a formation position of the current path by comparing the sensing voltage to reference voltages set to the respective LED groups, and
   wherein the voltage regulation circuit provides an output as an operating voltage of the peripheral circuit.

2. The control circuit of claim 1, wherein the voltage regulation circuit is configured to perform the regulation using a charging/discharging operation for electrical energy including one or more of a voltage component and a current component.

3. The control circuit of claim 1, wherein the dimming control signal is outputted as a pulse or DC voltage.

4. A control circuit of an LED lighting apparatus which includes a plurality of LED groups receiving a rectified voltage, comprising:
   a current control circuit configured to provide a current path corresponding to sequential light emissions of the LED groups;
   a voltage regulation circuit configured to receive a voltage lowered from the rectified voltage by one or more LEDs included in the LED groups, store the received voltage, regulate the stored voltage, and output the regulated voltage as a constant voltage; and
   a dimming control circuit configured to operate using the constant voltage provided from the voltage regulation circuit, and control a current flow on the current path in response to one or more of an internal sensing signal or an external control signal,
   wherein the dimming control circuit comprises:
      a sensor board configured to operate using the constant voltage, and output a dimming control signal corresponding to one or more of the internal sensing signal or the external control signal; and
      a dimming adjusting circuit having a resistance value which is varied in response to the dimming control signal and configured to control the current flow on the current path, and
   wherein the current control circuit comprises:
      a current control unit configured to form the current path corresponding to sequential light emissions of the LED groups, and control the formation of the current path by comparing a sensing voltage to reference voltages set to the respective LED groups; and
      a sensing resistor connected to the current control unit and configured to provide the sensing voltage corresponding to a current flowing through the current path.

5. The control circuit of claim 4, wherein the dimming control signal is outputted as a pulse or DC voltage.

* * * * *